(12) United States Patent
Smith, III

(10) Patent No.: US 6,357,722 B1
(45) Date of Patent: Mar. 19, 2002

(54) UNDERSEA HYDRAULIC COUPLING WITH GUIDE FOR VALVE ACTUATOR

(75) Inventor: Robert E. Smith, III, Missouri City, TX (US)

(73) Assignee: National Coupling Company Inc., Stafford, TX (US)

( * ) Notice: Subject to any disclaimer, the term of this patent is extended or adjusted under 35 U.S.C. 154(b) by 0 days.

(21) Appl. No.: 09/578,051

(22) Filed: May 23, 2000

(51) Int. Cl.$^7$ ................................................ F16K 51/00
(52) U.S. Cl. ................. 251/149.6; 251/149.1; 251/149.7
(58) Field of Search .................. 251/149, 149.1, 251/149.6, 149.7; 137/614.04

(56) References Cited

U.S. PATENT DOCUMENTS

| | | | | |
|---|---|---|---|---|
| 3,608,570 A | * | 9/1971 | McKann ..................... 137/75 |
| 4,123,089 A | * | 10/1978 | Viero et al. .................... 285/39 |
| 4,150,809 A | * | 4/1979 | Muller ..................... 251/149.4 |
| 4,350,321 A | * | 9/1982 | Berg ........................ 251/149.6 |
| 5,401,245 A | * | 3/1995 | Haining ........................ 604/86 |
| 5,901,761 A | * | 5/1999 | Rutter et al. ................. 141/346 |

* cited by examiner

Primary Examiner—Kevin Shaver
Assistant Examiner—David A Bonderer
(74) Attorney, Agent, or Firm—Fulbright & Jaworski

(57) ABSTRACT

An undersea hydraulic coupling is disclosed having a poppet valve with an actuator extending from the valve, and a guide between the actuator and bore. The guide is a sleeve shaped member around the actuator with flow passages which ensure a smooth flow of hydraulic fluid through the annulus between the coupling bore and actuator. The guide also helps prevent damage to the actuator, and aligns the actuator during connections, disconnections and use.

11 Claims, 1 Drawing Sheet

UNDERSEA HYDRAULIC COUPLING WITH GUIDE FOR VALVE ACTUATOR

BACKGROUND OF THE INVENTION

1. Field of the Invention

The present invention relates generally to hydraulic couplings used in undersea drilling and production applications. More particularly, the invention involves an undersea hydraulic coupling member with a poppet valve having a guide for the valve actuator that opens the poppet valve when it is connected with the opposing coupling member.

2. Description of Related Art

Subsea hydraulic couplings are old in the art. The couplings generally consist of a male member and a female member, with soft seals positioned within the female member to seal the junction between the male and female members. The female member is generally a cylindrical body with a relatively large diameter longitudinal bore at one end and a relatively small diameter longitudinal bore at the other. The small bore facilitates connections to hydaulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either abut the end or face of the male member or engage the cylindrical probe wall about its outer circumference. The hydraulic fluid is then free to flow through the female and male members of the coupling and seals prevent that flow from escaping about the joint and the coupling.

Poppet valves may be installed in the female member and in the male member of the coupling. Each poppet value closes when the coupling is broken so as to prevent fluid from leaking out of the system of which the coupling is a part. Springs or other bias means have been used to urge the poppet valves into the normally closed position.

In recent years, one or more pressure energized metal seals have been used in undersea hydraulic couplings of the foregoing type. For example, in U.S. Pat. No. 4,694,859, to Robert E. Smith III, assigned to National Coupling Company, Inc. of Stafford, Tex., an undersea hydraulic coupling and metal seal is disclosed. A reusable metal seal engages the outer circumference of the male member probe when it is positioned within the female member bore. The metal seal is held in place by a retainer. The male and female members each have valve actuators extending from the poppet valves. When the male member enters the female member bore and the valve actuators are engaged, each of the poppet valves is urged open and the poppet valve springs are compressed. U.S. Pat. No. 5,762,106 to Robert E. Smith III, assigned to National Coupling Company, Inc. also shows an undersea hydraulic coupling and radial metal seal that engages the diameter of the probe or male member.

In subsea hydraulic systems of the foregoing type, it is desirable to increase flow rates through the system of which the couplings are a part. The flow rate through the couplings, and the hydraulic lines attached to the couplings, are a function of the diameter of the internal bore through each coupling and line. As known by those skilled in the art, the maximum flow rate coefficient through a coupling may be determined and calculated based on the dimensions of the coupling bore.

To withstand the higher pressures of increased hydraulic flow through a coupling, the body of the coupling member, and the probe section of the male member in particular, must be of sufficient thickness to withstand the internal working pressure and the pressure external to the coupling at substantial ocean depths. However, it is undesirable to increase the size and thickness of the coupling to accommodate higher working pressures and higher subsea pressures. Remote operating vehicles (ROVs) must frequently be used to transport and engage and disengage coupling members. The ROVs may be limited in weight and size capacity to transport and install coupling members. Frequently, multiple coupling members are connected to a manifold plate and must be transported while subsea with couplings attached to an opposing manifold plate.

For the above reasons, attempts have been made to increase the flow rate through couplings, and at the same time to reduce the size and weight of the couplings. Couplings have been proposed having reduced diameters and extended male member probe sections. Poppet valves used in couplings of the foregoing type generally are positioned in the probe section and include a valve actuator extending from the apex of the conical valve face. The valve actuator of the male member engages the valve actuator of the female member to urge the poppet valves open and establish fluid flow through the coupling. In couplings with reduced diameters and extended male member probe sections, it also may be necessary to increase and extend the length of the actuator in one or both coupling members.

For example, U.S. patent application Ser. No. 09/293,554 to Robert E. Smith III, assigned to National Coupling Company, Inc. relates to an undersea hydraulic coupling having an extended probe section with a valve spring having a greater diameter than the diameter of the extended probe section. The larger spring helps provide sufficient forces to prevent the poppet valve of the male member from opening at high subsea pressures, while the extended probe section has a smaller diameter to minimize the required sealing surface. The poppet valve has a valve actuator extending therefrom through the extended probe section. However, forces including impact forces (i.e., collisions with other coupling members, equipment, or debris) and hydraulic forces (i.e., hydraulic fluid or seawater) may cause deflection, bending or other damage to the valve actuator when the coupling members are connected, disconnected or in use.

Alternatively, the actuators of poppet valves used in certain other hydraulic couplings have been extended through the probe section of the coupling for other reasons.

For example, U.S. Pat. Nos. 5,099,882 and 5,203,374 to Robert E. Smith III, assigned to National Coupling Company, Inc., show poppet valve actuators extending through the probe section of the male coupling member of pressure balanced undersea hydraulic couplings. In these patents, a flange on the poppet valve actuator is shown. The flange acts as a stop that abuts a shoulder in the bore which accommodates the valve actuator, and acts as a stop to prevent the actuator from blowing out of the coupling bore due to pressure.

It is desirable to include extended poppet valve actuators in one or both coupling members, but it is difficult to ensure alignment of the poppet valve actuator in the bore or cavity of the coupling member through which the poppet valve actuator extends. The actuator may become misaligned due to mechanical forces that would damage the actuator, and/or the pressure of hydraulic fluid, sea water, or other ocean debris impacting the actuator. Accordingly, an improved valve actuator is needed that will ensure alignment of the actuator and provide for smooth flow through the coupling members. Additionally, an improved poppet valve actuator is needed to allow the poppet valve to be precisely guided when the coupling members are connected together at substantial ocean depths. Moreover, an improved poppet valve actuator is needed that will help increase flow of hydraulic fluid through the bore in which the actuator is positioned in the coupling member.

SUMMARY OF THE INVENTION

The present invention resides in an undersea hydraulic coupling of the foregoing type including a male member, or probe, having a poppet valve with a guide on the valve actuator to ensure alignment of the actuator in the coupling member. The guide includes a plurality of ports, such as holes, grooves, or slots therethrough to allow hydraulic fluid to maintain a high flow rate through the annulus between the actuator and bore where it is positioned. The guide allows the poppet valve to be precisely guided in the male member probe section when the probe is connected to or disconnected from the female coupling member. The guide may be integral with the poppet actuator or, alternatively, may be a sleeve around the actuator or attached to the bore of the coupling member through which the actuator moves. The present invention allows increased flow of hydraulic fluid through the coupling member having an extended or lengthened poppet valve actuator.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF PREFERRED EMBODIMENTS

Figure 1:
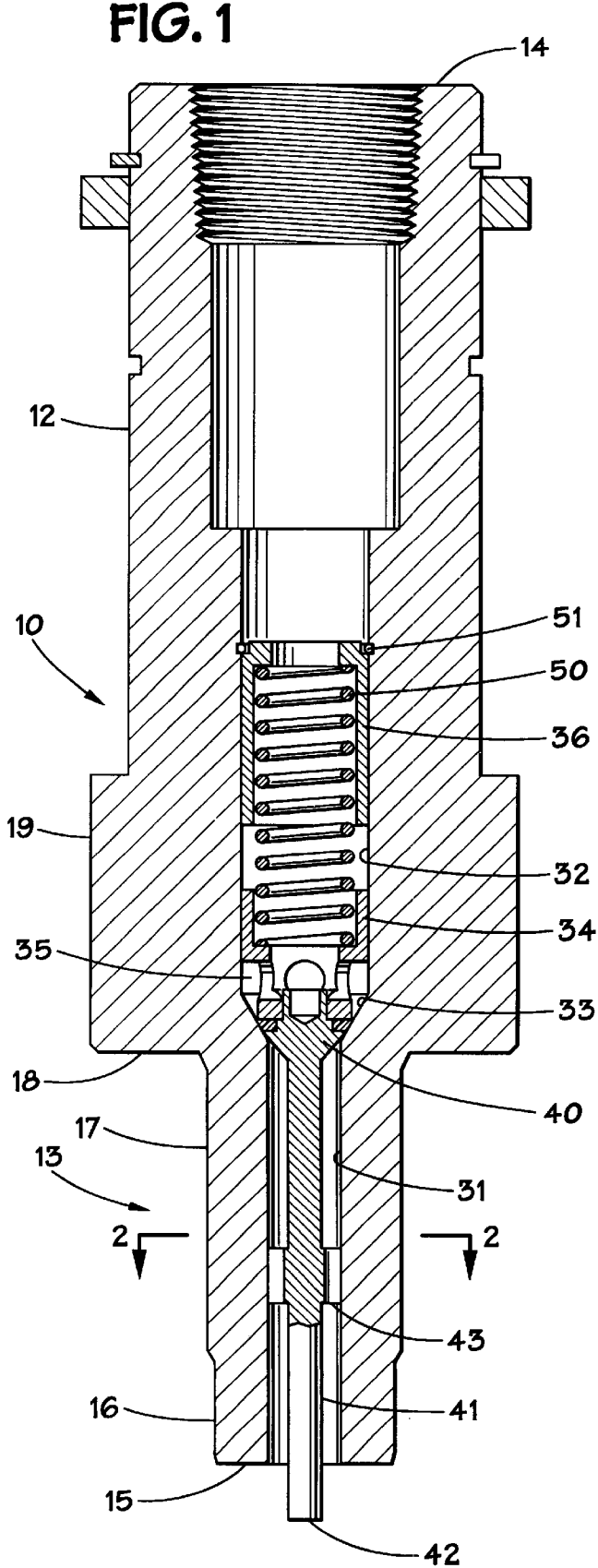
FIG. 1 is a cross-section view of a male member of the coupling according to a first preferred embodiment of the present invention.

FIG. 1 is a cross-section view of a male coupling member 10 which includes a handle 12 at the first end 14, a body section 19 which terminates at shoulder 18, and a probe section 13. The probe section 13 preferably has a stepped external diameter, with larger diameter section 17 adjacent shoulder 18 and smaller diameter 16 of the probe section terminating it at the second end or leading face 15 of the male coupling member. The male member has a stepped bore with a first section 32 extending to conical valve seat 33 and a second, smaller diameter section 31 from the conical valve seat to the second end 15 of the male member.

The poppet valve assembly of the male member is slidably received within the first section 32 of the male member bore. The poppet valve assembly includes cylindrical, hollow valve body 34 with valve body apertures 35. Valve head 40 is conical in shape and is dimensioned to seat and seal with valve seat 33. The helical valve spring 50 urges the poppet valve into the closed position, and is anchored with spring collar 36 which is held in place by collar clip 51.

The conical valve head has an actuator or stem 41 extending longitudinally from the apex of the conical valve. Optionally, the actuator, when the valve is in the closed position, extends longitudinally through and out from bore 31, such that the leading face or end 42 of the actuator extends past the leading face 15 of the probe member. Preferably, the diameter or the actuator is greater than 50% of the diameter of the second section 31 of the bore, but the actuator should be dimensioned sufficiently smaller in diameter to allow hydraulic fluid to flow through the annulus between the actuator and the bore.

Valve guide 43 is generally sleeve shaped and is positioned around the actuator. The valve guide has an external diameter dimensioned to have a sliding interfit within the second section 31 of the male member bore. Guide 43 aligns the actuator precisely within bore 31.

Figure 2:
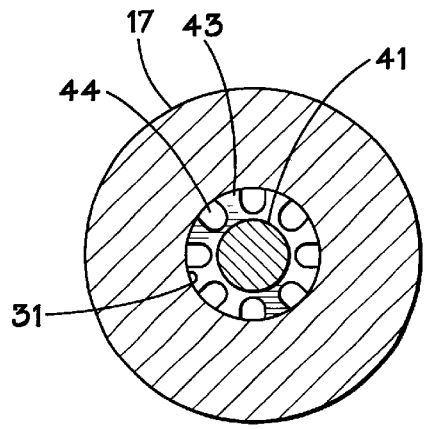
FIG. 2 is a section view of the male member of FIG. 1 taken along section line A —A in FIG. 1.

Now referring to FIG. 2, a cross-section view taken along section line A—A of FIG. 1 is shown. The larger diameter section 17 of the probe is provided with bore 31 extending therethrough. The poppet valve actuator 41, as described above, has an external diameter substantially smaller than the internal diameter of bore 31, but preferably at least 50% of the internal diameter of bore 31. The guide 43, however, has a sliding interfit with the actuator bore 31. For hydraulic fluid to pass the guide, a plurality of flow holes 44 extend longitudinally through the guide. The flow holes may be grooves, as shown in FIG. 2, or alternatively may be holes drilled through the guide or slots dimensioned to provide for smooth flow through bore 31 and past guide 43.

In a preferred embodiment, guide 43 is a sleeve shaped member with a central bore and is integral with the actuator. Alternatively, the guide may be attached to the actuator with a sliding or static interfit or machined into the bore section 31 in the male member probe. Depending on the length of the poppet valve actuator, one or more guides may be used and/or the guide may be an extended sleeve to help allow the poppet valve actuator to be precisely guided through bore 31.

Although the valve actuator guide is shown in the male member of the coupling, the invention is also suited for the female coupling member or both coupling members if desired. The invention enhances the stability of the valve actuator and prevents damage to the valve actuator of one or both coupling members, while ensuring a smooth flow of hydraulic fluid through the annulus between the actuator and bore.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member comprising:
   (a) a body section attached to a probe section, the probe section having a smaller diameter than the body section, and having a stepped cylindrical bore having a first section in the body section and a second section in the probe section, a valve seat between the first section and second section in the bore, and a poppet valve in the first section of the bore slideable between a closed position against the valve seat and an open position spaced from the valve seat; and;
   (b) a valve actuator extending longitudinally from the poppet valve through the second section of the bore, the valve actuator having an outer diameter greater than one half of the internal diameter of the second section of the bore; and (c) a guide slideable in the second section of the bore having an outer diameter greater than the valve actuator, the guide having a central bore through which the valve actuator extends the guide having a generally cylindrical shape with a plurality of apertures therein sufficient for hydraulic fluid to pass longitudinally therethrough.

2. The undersea hydraulic coupling of claim 1 wherein the slideable guide is integral with the valve actuator.

3. The undersea hydraulic coupling of claim 1 wherein the apertures in the guide are slots.

4. The undersea hydraulic coupling of claim 1 wherein the valve actuator extends out from the second section of the bore when the poppet valve is closed.

5. A male member of an undersea hydraulic coupling comprising:

(a) a body section, a probe section attached to the body section and having a smaller diameter than the body section, an internal bore having a first section with a larger diameter through the body section and a second section with a smaller diameter through the probe section;

(b) a poppet valve slideable in the first section of the internal bore of the male coupling member, the poppet valve having a valve actuator for urging the poppet valve open; the poppet valve actuator having an external diameter substantially smaller than the diameter of the second section of the male member bore; and (c) a sleeve shaped guide fitting around at least part of the poppet valve actuator of the male coupling member, the guide having a sliding interfit in the second section of the male member bore, the guide having a plurality of fluid passages therethrough.

6. An undersea hydaulic coupling member comprising:

(a) a cylindrical body with a first larger diameter attached to a cylindrical probe having a second smaller diameter, the body and probe having a fluid passage therethrough;

(b) a valve controlling flow through the fluid passage, the valve biased to the closed position against a valve seat;

(c) a stem extending from the valve and through the fluid passage for urging the valve away from the valve seat to open the valve; and (d) a first section of the stem having a first diameter and a second section of the stem having a second diameter, the diameter of the first section being smaller than the fluid passage to form an annulus therebetween for flow of fluid therethrough when the valve is open, and the diameter of the second section dimensioned to have a sliding interfit with the fluid passage and having a plurality of passages through the second section for flow of fluid therethrough when the valve is open.

7. The undersea hydraulic coupling member of claim 6 wherein the cylindrical probe has a stepped outer surface.

8. The undersea hydraulic coupling member of claim 6 wherein the fluid passage is stepped.

9. The undersea hydraulic coupling member of claim 6 wherein the valve is a poppet valve with a conical face and the seat is an inclined shoulder in the fluid passage.

10. The undersea hydraulic coupling member of claim 6 wherein the first section has a diameter greater than one half the diameter of the second section.

11. The undersea hydraulic coupling member of claim 6 wherein the second section of the stem comprises a sleeve around the first section of the stem.

* * * * *